Oct. 14, 1930.                E. H. LEWIS                1,778,082
                             CEILING PLATE
                          Filed Sept. 22, 1925
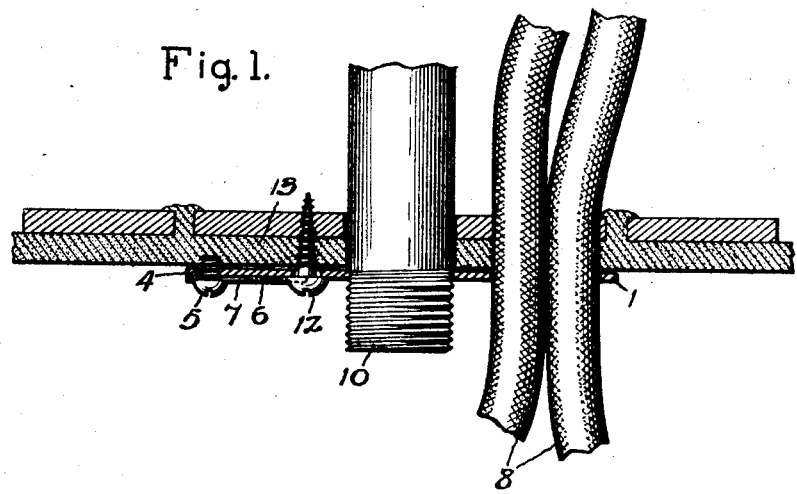
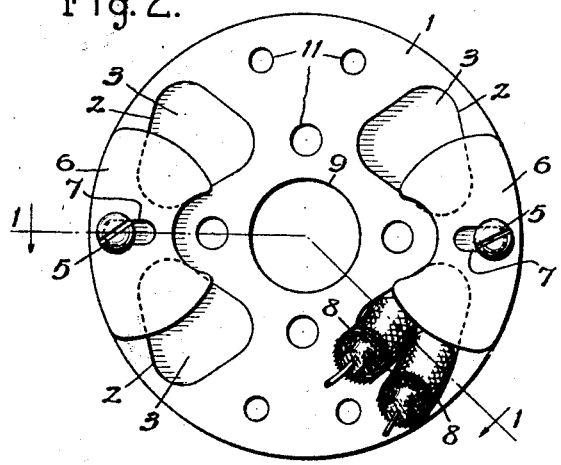
Inventor:
Edward H. Lewis,
by
His Attorney Patented Oct. 14, 1930

1,778,082

UNITED STATES PATENT OFFICE

EDWARD HOWARD LEWIS, OF BRIDGEPORT, CONNECTICUT, ASSIGNOR TO GENERAL ELECTRIC COMPANY, A CORPORATION OF NEW YORK

CEILING PLATE

Application filed September 22, 1925. Serial No. 57,810.

The present invention relates to electric house wiring and more especially to wiring carried in flexible insulating tubes and known as circular loom conduit.

Where such circular loom conduit comes out through a ceiling to permit the wires insulated thereby to connect with an electrolier or similar device, it is usually necessary to provide means in the form of ceiling plates to protect the plaster and to prevent the extension or withdrawal of the ends of the flexible conduit.

The object of my invention is the provision of an improved ceiling plate which may be readily installed, which operates effectually to retain the flexible conduits and which shall be of low manufacturing cost.

One embodiment of my invention is shown in the accompanying drawing in which Fig. 1 is a vertical section of my ceiling plate in installed relation, and Fig. 2 is a plan view of the plate with a pair of flexible conduits clamped thereto.

The ceiling plate shown in the drawing comprises a sheet metal disk 1 with two pairs of reversely directed pear-shaped openings 2 normally closed by knockouts 3. Between the openings of each pair is a tapped hole 4 for the reception of a binding screw 5 which operates to fix a double clamping cam or guard plate 6 to the disk 1. The opposite ends of each pair of openings 2 are in an arc struck from the adjacent screw hole 4 and the clamping cams or guard plates have their engaging edges in common arcs and provided centrally with cross slots 7 whereby they may be adjusted radially of the disk and transversely of the binding screws 5 and after being positioned fixed in clamping relation to the flexible conduits 7 by turning up the screws.

The disk 1 is provided with a large central aperture 9 to permit its assembly about a gas pipe 10, and with a plurality of distributed small holes 11 for the passage of screws 12 for attaching the plate to the ceiling 13 or for the passage of holding screws for other suspension devices such as crow feet.

To install my ceiling plate, one or both clamping cams or guard plates 6 are released by backing off a screw or screws 5 and knocking out one or more of the plugs 3 according to the number of pairs of flexible conduits to be clamped. The plate is then threaded over the gas pipe 10 and the ends of the flexible conduits 8 threaded through the respective hole 2. A pair of conduits will ordinarily be threaded through a hole which is made pear-shaped whereby room is provided for freely entering the conduits when they are positioned on the longer dimension of the hole. After being threaded through the plate, the conduits will be forced into the base end of the hole which is made of a width less than the sum of the diameters of the two conduits so that the opposite edges of the holes impinge upon and grip the conduits. The gripping cam or guard plate 6 is then positioned and forced radially inward so that it impinges at its end against the conduits and grips them between its edge and the edge of the hole 7 opposite thereto, and the screw 5 turned home.

While I have shown and described the best embodiment of the invention known to me, I do not desire to be restricted thereto.

What I claim as new and desire to secure by Letters Patent of the United States is,—

A ceiling plate provided with a pair of oppositely-disposed pear-shaped apertures, each of which is adapted to receive therein two flexible conduits, the sum of the diameters of which is greater than the large end of the aperture but less than the length thereof, a guard plate of sheet metal, the opposite ends of which are cam-shaped and the central portion of which is provided with a cross slot, and screw means passing through said cross slot and engaging said ceiling plate between the small ends of said pear-shaped apertures.

In witness whereof, I have hereunto set my hand this eighteenth day of September, 1925.

EDWARD HOWARD LEWIS.